Figure 1:
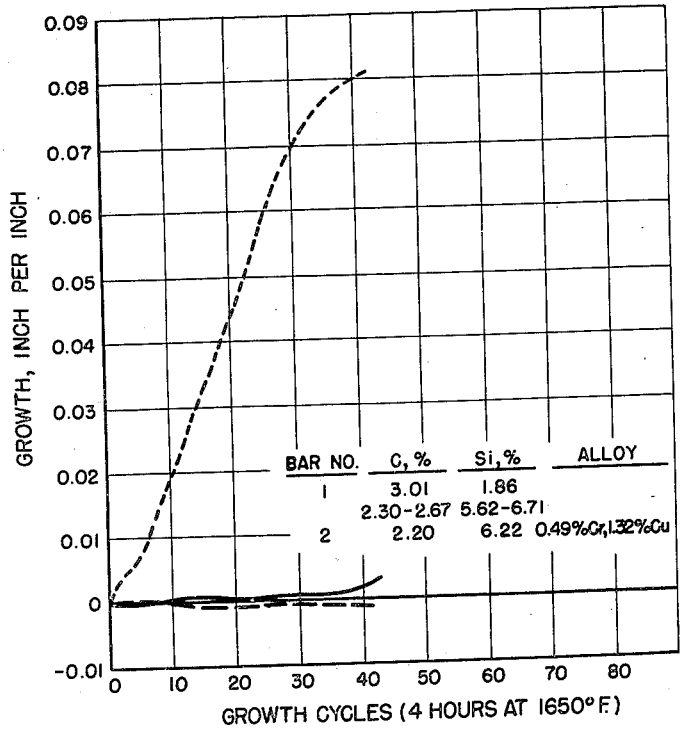

March 21, 1950      A. R. ELSEA      2,501,215
HIGH-SILICON CAST IRON

Filed Sept. 23, 1947      2 Sheets—Sheet 1

INVENTOR
Arthur R. Elsea
BY M.B. Lilly
ATTORNEY

Patented Mar. 21, 1950

2,501,215

UNITED STATES PATENT OFFICE 2,501,215

HIGH-SILICON CAST IRON

Arthur R. Elsea, Columbus, Ohio, assignor, by mesne assignments, to The Jackson Iron and Steel Company, Jackson, Ohio, a corporation of Ohio Application September 23, 1947, Serial No. 775,706

6 Claims. (Cl. 75—125)

This invention relates to high-silicon cast iron alloys and, more particularly, to growth-resistant, scale-resistant high-silicon cast iron alloys containing, as the only added alloying ingredients, small amounts of copper and chromium in combination.

When ordinary gray cast iron is employed in a variety of uses involving high temperatures with alternate cycles of heating and cooling, such as stove lids, grate bars, melting pots, and molds, there exist two inherent drawbacks arising from the nature of the cast iron itself, namely, growth and scaling. Growth comprises an increase in volume of the cast iron and has been ascribed to many causes. Present experimental data supports the theory that the growth of gray cast iron occurs in two stages. The first stage of growth arises from the decomposition of iron carbide to form iron and carbon having a larger volume than the original iron carbide. Second stage growth, which is considerably more detrimental than the first stage, is caused by repeatedly passing the iron through the transformation point, both on being heated up and cooling down. At the transformation temperature rapid changes in volume occur and the transforming metal adjacent to other metal which has already transformed has no such corresponding change in volume. As a result, a strain occurs which is too great for the iron to withstand and cracking is inevitable. It is known that high silicon cast irons containing at least 4.5% silicon are resistant to growth, although industry in the United States has been very slow to accept this fact. Additions of silicon to gray cast iron apparently reduce first stage growth by decreasing the amount of iron carbide in the cast structure, and at the same time eliminate second stage growth by raising the transformation point of the iron above the temperatures to which it is subjected in use.

The scaling difficulties encountered, however, are in many instances more detrimental than the growth of the cast irons. High silicon cast irons which are highly resistant to growth, are quite susceptible to scaling and, to date, no alloys of the cast iron type have been developed which eliminate the problem of scaling. This problem is of critical importance in cast iron, because oxygen can penetrate almost entirely through this metal and produce large amounts of iron oxide, thereby greatly weakening the structure of which this metal forms a part. Stove lids, grate bars, and melting pots are objects normally made of cast iron which have to be replaced at relatively frequent intervals because of their destruction by scaling.

It is an object of this invention, therefore, to provide a high silicon cast iron alloy that is particularly resistant to scaling.

A further object of this invention is to provide a cast iron alloy that is highly resistant to both growth and scaling.

A still further object of this invention is to provide an improved gray cast iron alloy which may be produced by normal cupola procedures.

Another object of this invention is to provide an inexpensive, growth-resistant and scale-resistant high silicon cast iron alloy produced by adding to the high silicon gray cast iron very small amounts of two alloying elements in combination.

Figure 3:
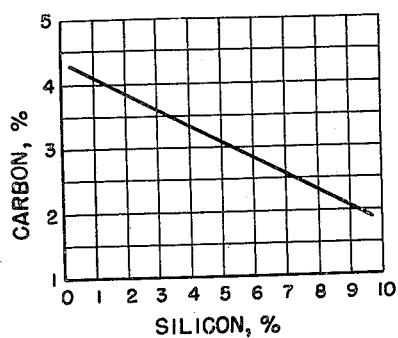
Figure 4:
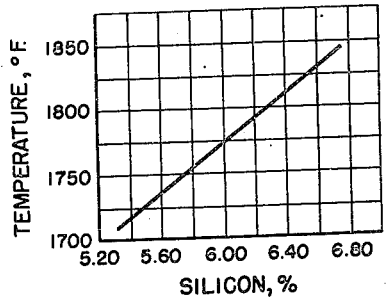
Figure 2:
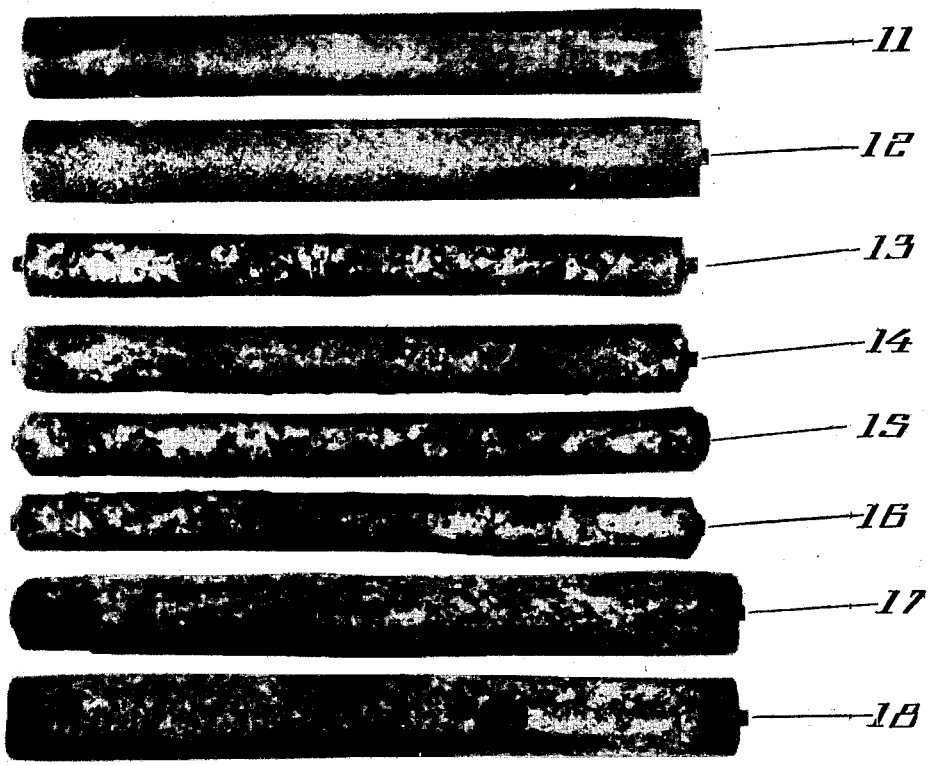

Other objects and advantages of the present invention will become apparent from the following detailed description thereof when read in conjunction with the accompanying drawings, in which Figure 1 is a graph comparing the growth of high silicon cast irons, ordinary gray cast irons, and high silicon cast iron alloys, Figure 2 is a photograph of a number of cast iron bars that have been subjected to alternate cycles of heating and cooling, Figure 3 is a chart showing the carbon-silicon eutectic in gray cast irons, and Figure 4 is a graph showing the effect of silicon content on the transformation temperature for high silicon cast iron.

It has been discovered that the addition of copper and chromium, in combination with one another, to high silicon gray cast irons imparts to those metals very high resistance to scaling and does not adversely affect their already high resistance to growth. This latter point is illustrated graphically in Figure 1, which is a graph depicting the growth of the alloys set forth in the following Table 1:

Table 1

| Bar Number | Carbon, Per Cent | Silicon, Per Cent | Other Elements |
|---|---|---|---|
| 1 | 3.01 | 1.86 | |
| Average of 40 | 2.3–2.67 | 5.62–6.71 | |
| 2 | 2.20 | 6.22 | 0.49% Cr, 1.32% Cu. |

All of the bars from which the data were obtained to draw the curves shown in Figure 1 were originally ten inches long and were subjected to identical cyclic heating for 41 cycles, wherein each cycle consisted of heating to 1650° F., holding at that temperature four hours and air-cooling to room temperature. Bar No. 2, which contained chromium and copper, is shown to have even less growth than the line representing the average of the gray cast irons containing from 5.62 to 6.71% silicon. A comparison of bar No. 1 and the line depicting the average of the high silicon bars clearly indicates how effectively the addition of large amounts of silicon to gray cast iron have reduced the growth thereof.

By far the most important property of the alloy comprising the present invention is its resistance to scaling. In the photograph designated as Figure 2, seven bars are shown which were subjected to identical heat treatment, and the remaining bar was left untreated for comparison purposes. These bars have a composition shown in the following Table 2:

Table 2

| Bar No. | C, Percent | Si, Percent | Mn, Percent | Cr, Percent | Cu, Percent | Growth, Inch Per Inch × 1000 |
|---|---|---|---|---|---|---|
| 11 | Untreated sample | | | | | |
| 12 | 2.20 | 6.22 | | 0.49 | 1.32 | −0.5 |
| 13 | 2.35 | 6.09 | 0.78 | | | 2 |
| 14 | 2.64 | 6.04 | 0.75 | | | 2 |
| 15 | 2.63 | 4.88 | | | | 21 |
| 16 | 2.32 | 5.89 | 2.70 | | | 14 |
| 17 | 3.12 | 1.66 | 0.70 | | | 73 |
| 18 | 3.01 | 1.86 | 0.80 | | | 80 |

Bars shown in Figure 2 were heated from room temperature to 1650° F. over a period of four hours and held at this temperature for 4 hours, followed by air-cooling to room temperature. The bars were then measured to the closest thousandth inch and returned to the cold furnace for another cycle. This was repeated until each specimen had been subjected to forty-one cycles. The high silicon cast iron bars, Nos. 13, 14, 15, and 16 showed considerable scaling, as is apparent from comparing their dimensions with the untreated bar No. 11. Bars Nos. 17 and 18 composed of ordinary cast iron do not show scaling as much as do the high silicon bars, but this is due to the fact that the scale does not adhere to high silicon bars while it does adhere to the low silicon ordinary cast iron bars. If all of the scale formed on bars Nos. 17 and 18 were removed, the remaining bar would be as small or smaller in diameter than bar No. 16.

The bar which contains copper and chromium in small amounts in addition to a relatively high percentage of silicon, bar No. 12, is easily the outstanding bar of all those treated, and no visible scaling can be detected. Bar No. 12 contains about 2.20% carbon, 6.22% silicon, 0.49 chromium, and about 1.32% copper. This composition represents one of the preferred alloys comprising the present invention.

Referring now to the alloy comprising the present invention in more detail, the metal forming the basis of the present alloy comprises a gray cast iron to which there has been added at least about 5% silicon to produce the metal which is designated throughout this specification and the accompanying claims as "high silicon cast iron." The amount of carbon present in this basis metal will vary from about 2.0% to about 3.0%. The lower limit of 2.0% carbon is established by practicability, since the production of a cast iron containing less than 2% carbon is extremely difficult and, in the present instance, completely unnecessary. The upper limits of 3% carbon is established by the fact that it is highly undesirable to exceed the limit of carbon-silicon eutectic where minimum growth is desired. This fact is graphically illustrated in Figure 3 wherein carbon is plotted against silicon and the single line drawn represents the eutectic composition. Although no theory has been proved as to why this fact is so, experimental data have shown that compositions below the eutectic line show considerably less growth than those above the line. Since approximately 5% silicon is the minimum amount necessary for high silicon iron, it follows that approximately 3% carbon is the maximum amount of carbon that can be present and still remain below the eutectic line. It is further evident from Figure 4 that the upper limit of carbon will preferably decrease as the amount of silicon is increased so that at 8% silicon about 2.25% carbon is the optimum upper limit. The preferred range of carbon has been found to be from about 2.0 to about 2.6%.

As indicated above, the preferred lower limit of silicon is about 5%, although 4.5% silicon is sufficient to produce cast iron alloys having adequate growth resistance and scaling resistance for certain purposes. When less than 4.5% silicon is used, the increase in the transformation point is so slight that only a minor amount of increase in growth-resistance and sealing-resistance is to be obtained. It has been found to be impracticable to incorporate more than about 8% silicon in the usual gray cast iron. Moreover, no additional benefits are obtained by going beyond 8% silicon, since the increase in transformation temperature is offset by the greatly increased brittleness of the resulting alloy. The silicon content preferably ranges from about 5.60 to about 6.75%, although the exact amount of silicon present will depend upon the peak temperature which will be encountered in the use of the alloy. Figure 4 graphically illustrates the increase in transformation temperature of high silicon cast iron by increasing the silicon content thereof. Although cast iron containing 6.75% silicon has a transformation temperature of approximately 1840° F., good engineering would require that the peak temperature to which articles made of this iron would be subjected would not be greater than 1750° F., thereby allowing 100° F. as a margin of safety. Where lower peak temperatures are to be encountered, it is advantageous to employ lower amounts of silicon in order to increase impact strength at room tempertaures.

The addition of copper or chromium, singly, to high silicon gray cast iron has little or no effect upon the scale-resistant properties of the cast iron. The combination of these two metals, however, produces a synergistic effect in that greatly increased resistance to scaling is thereby imparted to the high silicon gray cast iron. About 0.75% copper is a minimum effective amount of this element and about 3.00% marks the upper limit. Percentages of copper varying from about 1.25 to about 1.55 have been found to be preferable, since this metal is quite expensive and there is little or no advantage in adding more than about 1.25% to the high silicon cast iron. The amount of chromium ranges from about 0.30 to about 1.0%. Under 0.30%, the effect of chromium is somewhat indefinite and amounts greater than 1% stabilize the carbide in the cast iron and thus increase the first stage growth. From about 0.3 to about 0.6% chromium is preferable, the optimum percentage being about 0.5% chromium.

In all gray cast irons there is always present at least some manganese, usually up to about 0.8%. While manganese is not an essential element in the present invention, it is desirable in amounts in which it is usually present in gray cast iron. When manganese is present in an amount materially greater than 0.8%, it has the undesirable effect of stabilizing the carbide and increasing the growth of the cast iron. Other ingredients which are included in the usual gray cast iron, such as sulphur and phosphorus, and residual traces of other elements and metals have no detrimental effect upon the present alloy.

This alloy of the present invention may be produced according to normal cupola melting practice, in addition to other procedures well-known in the art. For example, silvery pig iron, which may contain about 10% silicon, and steel scrap or other similar source of iron are melted in a cupola. Copper and chromium are added to the ladle. The copper may conveniently be added in the form of copper shot, and the chromium is preferably added as ferrochromium because of the low cost of the compound.

The present invention, as described above in some detail, relates to a high silicon gray cast iron alloy to which is added a combination of chromium and copper as the sole alloying ingredients. This alloy shows remarkable resistance to scale formation and growth upon repeated cycles of heating and cooling.

In the following claims, the words "high silicon" indicate an amount of at least 5.0% silicon, unless otherwise specifically indicated. Also, the words "added alloying elements" indicate only those elements that are purposely added, and do not relate to adventitious elements or elements which are normally present in gray cast iron. Throughout the specification and claims the words "high silicon gray cast iron" refer to high silicon iron produced by adding silicon to gray cast iron and do not relate to the color of the fracture.

What we claim is:

1. A high-silicon gray cast iron having at least 5.0% silicon and containing as the only added alloying ingredients from about 0.3 to about 1.0% chromium and from about 0.75 to about 3.0% copper.

2. A high silicon cast iron having at least 5.0% silicon and containing as the only added alloying metals from about 0.3 to 0.6% chromium and from about 1.25 to about 1.55% copper.

3. A high silicon gray cast iron having at least 5.0% silicon and containing as the only added alloying ingredients about 0.5% chromium and about 1.25% copper.

4. A gray cast iron containing from about 2.0 to about 3.0% carbon, from about 4.5 to about 8.0% silicon, from about 0.75 to about 3.0% copper, and from about 0.3 to about 1.0% chromium.

5. A gray cast iron consisting essentially of from 2.0 to 2.6% carbon, from 5.7 to 6.75% silicon, from 0.75 to 1.55% copper, and from 0.3 to about 0.6% chromium.

6. A gray cast iron containing as the essential ingredients thereof 2.20% carbon, 6.22% silicon, 1.32% copper, 0.49% chromium, and the balance iron.

ARTHUR R. ELSEA.

REFERENCES CITED

The following references are of record in the file of this patent:

UNITED STATES PATENTS

| Number | Name | Date |
| --- | --- | --- |
| 2,167,301 | Jones | July 25, 1939 |
| 2,207,350 | Lorig et al. | July 9, 1940 |
| 2,287,850 | Young | June 30, 1942 |
| 2,390,594 | Krause | Dec. 11, 1945 |